United States Patent [19]

Kompelien

[11] Patent Number: 4,565,092
[45] Date of Patent: Jan. 21, 1986

[54] FLOW SENSOR WITH ADJUSTABLE SENSITIVITY

[75] Inventor: Arlon D. Kompelien, South Richfield, Minn.

[73] Assignee: Honeywell Inc., Minneapolis, Minn.

[21] Appl. No.: 654,577

[22] Filed: Sep. 25, 1984

[51] Int. Cl.$^4$ .............................................. G01F 1/46
[52] U.S. Cl. .................................. 73/202; 73/861.65; 73/3
[58] Field of Search ................ 73/3, 182, 202, 861.65, 73/861.66, 861.67, 863.61, 861.42, 861.52

[56] References Cited

U.S. PATENT DOCUMENTS

| | | | |
|---|---|---|---|
| 1,295,046 | 2/1919 | Lohnes | 73/861.67 |
| 2,207,880 | 7/1940 | Skoldberg | 73/861.67 |
| 2,297,408 | 9/1942 | Hardebeck | 73/202 |
| 2,824,918 | 2/1958 | Saunders . | |
| 2,862,387 | 12/1958 | Webster . | |
| 3,382,715 | 5/1968 | Larkham et al. | 73/861.65 |
| 3,564,915 | 2/1971 | Tomota et al. | 73/861.22 |
| 3,777,563 | 12/1973 | Yamasaki et al. . | |
| 3,803,921 | 4/1974 | Dieterich | 73/861.66 |
| 4,262,287 | 4/1981 | McLoughlin et al. | 73/195 |

FOREIGN PATENT DOCUMENTS 741942  12/1955  United Kingdom ............. 73/861.65

*Primary Examiner*—Herbert Goldstein
*Attorney, Agent, or Firm*—Mitchell J. Halista; Trevor B. Joike

[57] ABSTRACT

A flow sensor having adjustable sensitivity includes a differential pressure sensing element located in an internal compartment within a rotatable cylinder. The compartment is connected between diametrically opposite fluid ports on the surface of the cylinder by fluid channels. In one embodiment, the sensor is located on a diaphragm partitioning the compartment into a first and a second chamber with the sensor being responsive to a distortion of the diaphragm induced by a differential pressure. In a second embodiment, the sensor is a flow sensor and is arranged to monitor a fluid flow through the compartment induced by a differential pressure. The cylinder is rotatable on an axis at located right angles to a fluid flow thereacross whereby the ports are selectively located at a desired angle with respect to the fluid flow path. The cylinder is located within a fluid-tight housing having a fluid inlet and a fluid outlet arranged to direct a fluid being monitored by the sensor around the cylinder. An external adjusting knob is connected to the axis of the cylinder through a first fluid-tight access opening in the housing to provide a means for selectively rotating the cylinder. Electrical connections to the pressure sensing element are provided through a second fluid-tight access opening in the housing.

20 Claims, 4 Drawing Figures

FLOW SENSOR WITH ADJUSTABLE SENSITIVITY

BACKGROUND OF THE INVENTION

Field of the Invention

The present invention relates to flow sensors. More specifically, the present invention is directed to a flow sensor having an adjustable sensitivity.

SUMMARY OF THE INVENTION

The object of the present invention is to provide an improved flow sensor having an adjustable sensitivity.

In accomplishing this and other objects, there has been provided, in accordance with the present invention, a flow sensor having a differential pressure sensing means, a hollow container means having an internal compartment, a first fluid port on said container means communicating with said compartment, a second fluid port on said container means diametrically opposite to said first port and communicating with said compartment, differential pressure transducer means located in said compartment and responsive to a differential pressure between said first and second ports to produce an output signal representative of said differential pressure and a means for selectively rotating said container means on a fixed axis of rotation.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Figure 1:
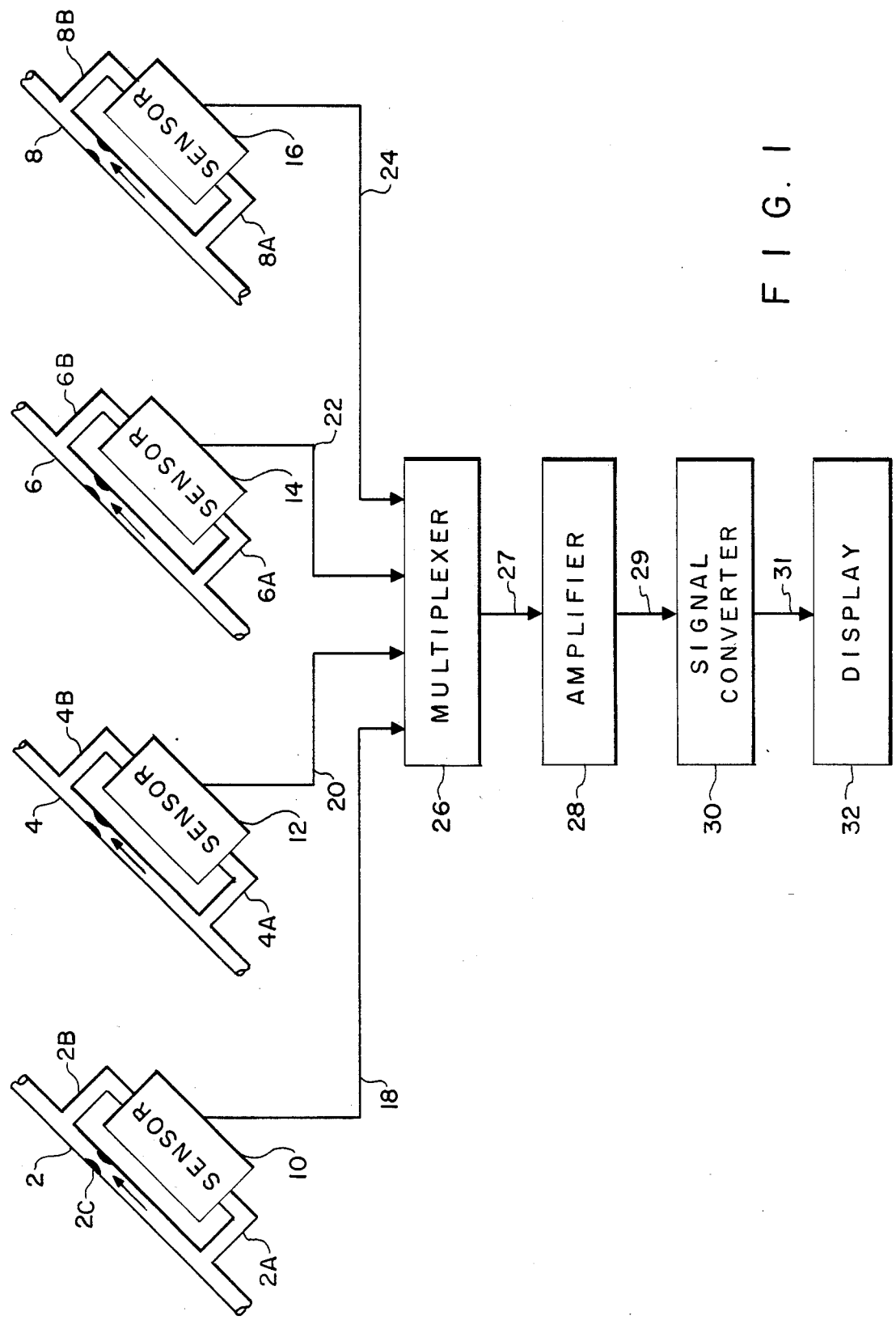
FIG. 1 is a block diagram illustration of a flow measuring system utilizing an example of the present invention.

Referring to FIG. 1 in more detail, there is shown an example of a fluid pressure measuring system utilizing a plurality of fluid flow lines 2, 4, 6 and 8 with each of the flow lines having a corresponding by-pass line and a flow restriction, e.g., flow line 2 has by-pass lines 2A and 2B and restriction 2C. Each of the by-pass lines 2-8 has a fluid pressure sensor, e.g., sensors 10, 12, 14 and 16 connected therein. For example, the fluid pressure sensor 10 is connected between the by-pass flow lines 2A and 2B to subject the sensor 10 to the fluid pressure differential existing between the flow lines 2A and 2B produced by the flow restriction 2C which, in turn, is representative of the fluid flow in flow line 2.

The output signals of each of the sensors 10-14 are applied to respective output signal lines 18, 20, 22 and 24. These signal lines 18-24 are connected to the respective inputs of a signal multiplexer 26. The signal on the single output of the multiplexer 26 is representative of a selected one of the signal lines 18, 20, 22 and 24 and is applied to a multiplexer output line 27. The output line 27 is connected to an input of a signal amplifier 28. An output from the amplifier 28 applied along amplifier output line 29 is connected to a signal converter 30 having an output line 31 connected to a display 32. Thus, the sensors 10, 12, 14, and 16 are each effective to produce an output signal representative of their respective sensed pressures which signals are selected by the multiplexer 26 and ultimately displayed on the display 32 as desired. It should be noted that while the plurality of sensors 10, 12, 14 and 16 are shown in a by-pass line configuration, the plurality of sensors 10, 12, 14 and 16 may be each arranged directly in the respective ones of the main flow lines without the use of a by-pass line without departing from the scope of the present invention.

Figure 2:
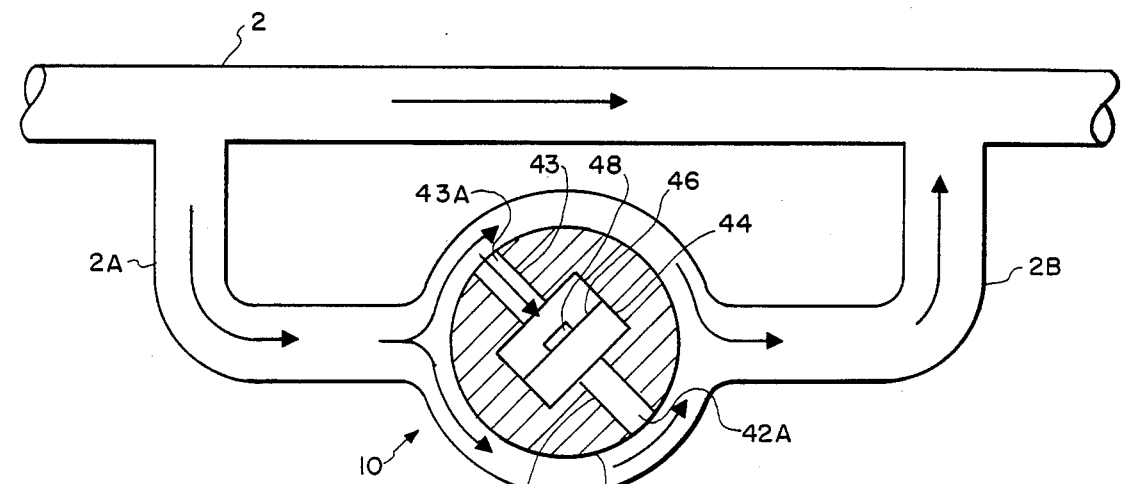
FIG. 2 is a cross-section of an example of a sensor suitable for use in the system shown in FIG. 1 and taken along a plane orthogonal to the axis of rotation of the sensor.

In FIG. 2, there is shown a cross-section taken along a plane orthogonal to the plane of rotation of an example of one of the sensors 10, 12, 14 and 16, e.g., sensor 10, with similar reference numbers being used in FIG. 2 to identify elements used in common with FIG. 1. Thus, the by-pass lines 2A and 2B are arranged to direct a fluid flow from the main fluid flow line 2 into a housing 36 containing a rotatable hollow container in the form of a cylinder 40 having its axis of rotation positioned at right angles to the direction of flow of the fluid through the housing 36 between the lines 2A and 2B. The fluid flow is produced by the differential pressure between the bypass lines 2A, 2B produced by the restriction 2C. A pair of fluid flow passages 42, 43 are connected between respective ones of diametrically opposite ports 42A, 43A on the surface of the cylinder 40 and an internal compartment 44 located within the cylinder 40. The compartment 44 is divided by a diaphragm 46 supporting a fluid pressure transducer 48 thereon. Thus, the movement of the diaphragm 46 in response to a pressure differential applied to opposite sides thereof is effective to produce an output signal from the transducer 48, in a manner well-known in the art. For example, the sensor 48 may include piezoresistive bridge circuit elements affixed to the diaphragm 46 which change their dynamic characteristics when subject to bending stresses and, accordingly, produce corresponding output signals representative of the differential pressure producing the stress on the elements.

Figure 3:
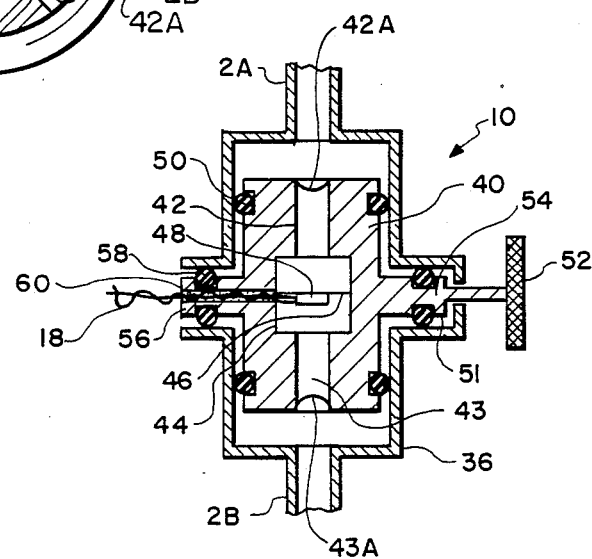

As shown in FIG. 3, which is a cross-section of the sensor 10 taken along a plane containing the axis of the flow channels 42, 43., the rotor 40 is fluid-sealed to the interior walls of the housing 36 by suitable O-rings 50 located on the surface of the rotor 40. One side of the rotor 40 is provided with a first axial extension 51 which extends out of the housing 36 and is connected to an adjusting knob 52 external to the housing 36 while the extension 51 is fluid-sealed to the internal surface of the housing 36 by an O-ring 54 encircling the extension 51. A second axial extension 56 of the rotor 40 is provided on the other side of the rotor 40 from the first extension 51 and extends out the housing 36 while being sealed to the internal surface of the housing 36 by an O-ring 58 encircling the second extension 56. The electrical connecting lines 18 to the sensor 48 are guided through an axial bore 60 in the second extension 56 and are sealed therein by a suitable sealing compound to provide a fluid-tight seal between the lines 18 and the wall defining the bore 60.

In operation, the cylinder 40 is rotated by means of the knob 52 to a position which changes the orientation of the fluid ports 42A, 43A and fluid inlet passages 42, 43 with respect to the fluid flow around the outside of the cylinder 40. Such a rotation subjcts the ports 42A, 43A to differing fluid pressures existing in the fluid flowing around the cylinder 40. Specifically, when the fluid channels 42, 43 are aligned with the fluid flow, the fluid pressure differential applied to the diaphragm 46 is a maximum while when the rotor 40 is rotated to have the fluid passages 42 and 43 orthogonal to the fluid flow, the differential pressure across the diaphragm 46 would be zero. Varying amounts of differential fluid pressure would occur between these end positions of the rotor 40.

Figure 4:
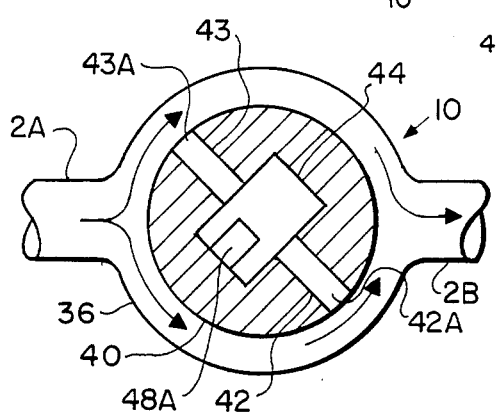
FIG. 3 is a cross-section of the sensor shown in FIG. 2 along a plane containing the axis of rotation of the sensor and FIG. 4 is a cross-section of an example of an alternate embodiment of a sensor suitable for use in the system shown in FIG. 1 and taken along a plane orthogonal to the axis of rotation of the sensor.

In FIG. 4, there is shown a cross-section taken along a plane orthogonal to the plane of rotation of an alternate embodiment of one of the 10, 12, 14 and 16, e.g., sensor 10, with similar reference numbers being used in FIG. 4 to identify elements used in common with FIGS. 1 and 2. Thus, the bypass lines 2A and 2B are arranged to direct a fluid from the main flow line 2 into a housing 36 containing a hollow container in the form of a cylinder 40 having its axis of rotation positioned at right angles to the direction of flow of the fluid through the housing 36 between the lines 2A and 2B. A pair of fluid flow passages 42, 43 are connected between respective ones of diametrically opposite ports 42A, 43A on the surface of the cylinder 40 and an internal compartment 44 located within the cylinder 40. A flow sensor 48A is positioned within the compartment 44 to detect a fluid flow between the ports 42A, 43A induced by the differential pressure therebetween. Thus, the flow of fluid around the cylinder 40 is induced by the differential pressure between the bypass lines 2A and 2B produced by restriction 2c. Similarly, the axial position of the cylinder 40 produces a flow through the compartment 44 in proportion to the differential pressure at the ports 42A, 43A. Thus, the flow through the compartment 44 sensed by the transducer 48A is proportional to the flow in the main flow line 2. The transducer 48A may be a flow sensor of the type which uses a matrix or bridge of resistive elements that are heated by an electrical current with a fluid flow across the surface of one or more of the elements serving to cool the elements to change its electrical resistance and unbalance the bridge circuit. Thus, the amount of unbalance of the bridge circuit, i.e., its output signal, is proportional to the fluid flow through the compartment 44 which, in turn, is proportional to the fluid flow in the main line 2 in a manner similar to that previously discussed with respect to the sensor shown in FIGS. 2 and 3.

The sensor of the present invention has particular utility in a flow measuring system utilizing a plurality of the sensors 10, 12, 14, 16 either in a single installation, e.g., an industrial process monitor, or in a plurality of separate installations, e.g., an individual sensor located on a fuel gas supply for each of a plurality of consumers. In the first application, the sensors would be multiplexed to a shared amplifier as shown in FIG. 1 while in the latter application, a shared amplifier and detector system would be transported to each sensor to obtain an output therefrom. Since in either such measuring circuits employing a plurality of the sensors 10, 12, 14, 16, the sensors would each have to be calibrated to match their individual sensitivity to the shared amplifier, the sensor calibration is achieved by simply rotating each sensor by means of the knob 52 until its measured transducer output signal is the same as the output signals from the other sensors when the same input fluid flow is applied to each flow line. Thus, all sensors will be calibrated to produce an accurate output signal for a single measuring circuit, independent of the electronic sensitivity variations of each sensor and any other extraneous factors affecting the transducer output signal. The calibrated position of the sensor, which may be determined during the manufacture of the sensor, is retained during the pressure measuring operation of the system to assure that the shared amplifier system will produce an accurate measurement of each sensed fluid pressure. As previously mentioned, the sensor shown in FIGS. 2 and 3 may be employed directly in respective ones of a plurality of the main flow lines without the use of a bypass line and with a sensor operation similar to that described above.

Accordingly, it may be seen that there has been provided, in accordance with the present invention, an improved flow sensor having an adjustable sensitivity.

The embodiments of the present invention in which an exclusive property or privilege is claimed are defined as follows:

1. A flow sensor comprising
a hollow cylindrical container means having an internal compartment,
a first fluid port on said container means communicating with said compartment,
a second fluid port on said container means diametrically opposite to said first port and communicating with said compartment,
differential pressure transducer means located in said compartment and responsive to a differential pressure between said first and second ports to produce an output signal representative of said differential pressure and,
means for selectively rotating said container means on a fixed axis of rotation, said means for rotating including a substantially cylindrical housing having an axis parallel to said axis of rotation of said container means to form an annulus therewith.

2. A sensor as set forth in claim 1 wherein said transducer means includes a flexible partition means arranged to divide said compartment into a first chamber communicating with said first port and a second chamber communicating with said second port and sensing means responsive to a flexing of said partition means in response to a differential applied between said first and second ports to produce an output signal representative of said flexing.

3. A sensor as set forh in claim 1 wherein said transducer means includes a flow sensing means arranged to sense a fluid flow between said first and second ports produced a differential pressure therebetween to produce an output signal respresentative of said flow.

4. A sensor as set forth in claim 1 wherein said means for rotating includes means for mounting said container means with said axis of rotation orthogonal to the direction of flow of a fluid to be monitored by the pressure sensor means.

5. A sensor as set forth in claim 1 wherein said means for rotating includes signal communicating means for conducting a signal from said sensing means externally of said container means.

6. A sensor as set forth in claim 1 wherein said container means includes a cylinder having its cylindrical axis coincident with said axis of rotation.

7. A sensor as set forth in claim 2 wherein said sensing means includes a piezoresistive bridge circuit.

8. A sensor as set forth in claim 1 wherein said means for rotating has a fluid inlet port and a fluid outlet port for directing a fluid to be monitored by the transducer means orthogonal said axis of rotation and across said first and second fluid ports.

9. A sensor as set forth in claim 8 wherein said means for rotating includes a selective rotatable knob, a fluid-tight access opening in said housing means and means connecting said knob to said container means through said opening for selectively rotating said housing means on said axis of rotation.

10. A sensor as set forth in claim 9 wherein said means for rotating includes signal communicating means for conducting said signal from said transducer means externally of said container means and a second fluid-tight access opening providing an exit for said signal communicating means from said housing means.

11. A sensor as set forth in claim 8 wherein said means for rotating including sealing means for providing a fluid-tight seal between said container means and an internal surface of said housing means while allowing said flow of the fluid to be monitored.

12. A sensor system comprising a plurality of pressure sensors with each sensor including a hollow cylindrical container means having an internal compartment, a first fluid port on said container means communicating with said first compartment, a second fluid port on said container means diametriclly opposite to said first port and communicating with said compartment, differential pressure transducer means located in said compartment and responsive to a differential pressure between said first and second ports to produce an output signal representative of said differential pressure has been and a means for selectively rotating said container means on a fixed axis of rotation, said means for rotating including a substantially cylindrical housing having an axis parallel to said axis of rotation of said container means, a signal multiplexer means having a plurality of signal inputs connected to respective ones of said transducer means, and a single signal selectively connectable to each of said inputs, and a signal detector means connected to an output of said multiplexer means for detecting an output signal from said multiplexer means representative of a sensor signal selected by said multiplexer means.

13. A sensor system as set forth in claim 12 wherein each of said sensors is located in a respective fluid by-pass line connected to a respective main flow line for monitoring the pressure of a fluid therein.

14. A sensor system as set forth in claim 12 wherein said means for rotating includes means for mounting said container means with said axis of rotation orthogonal to the direction of flow of a fluid to be monitored by the pressure sensor means.

15. A sensor system as set forth in claim 12 wherein each transducer means in each sensor includes a flexible partition means arranged to divide said compartment into a first chamber communicating with said first port and a second chamber communicating with said second port and sensing means responsive to a flexing of said partition means in response to a differential applied between said first and second ports to produce an output signal representative of said flexing.

16. A sensor system as set forth in claim 12 wherein each transducer means in each sensor includes a flow sensing means arranged to sense a fluid flow between said first and second ports produced a differential pressure therebetween to produce an output signal representative of said flow.

17. A sensor system as set forth in claim 12 wherein said means for rotating in each sensor includes means for mounting said container means with said axis of rotation orthogonal to the direction of flow of a fluid to be monitored by the transducer means.

18. A sensor system as set forth in claim 12 wherein said means for rotating in each sensor includes means for conducting said signal from said transducer means externally of said container means.

19. A sensor system as set forth in claim 12 wherein said container means in each sensor includes a cylinder having its cylindrical axis coincident with said axis of rotation.

20. A sensor system as set forth in claim 12 wherein said means for rotating in each sensor housing means includes a fluid inlet port and a fluid outlet port for directing a fluid to be monitored by the transducer means orthogonal said axis of rotation and across said first and second fluid ports.

* * * * *